May 25, 1965     T. T. CONRAD     3,184,861
POSITION DEVIATION SENSING DEVICE UTILIZING SKIN EFFECT
Filed April 2, 1962
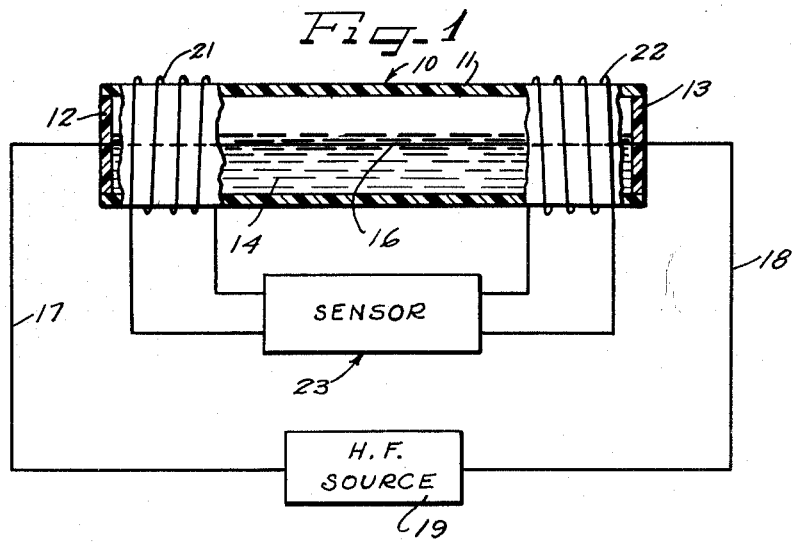
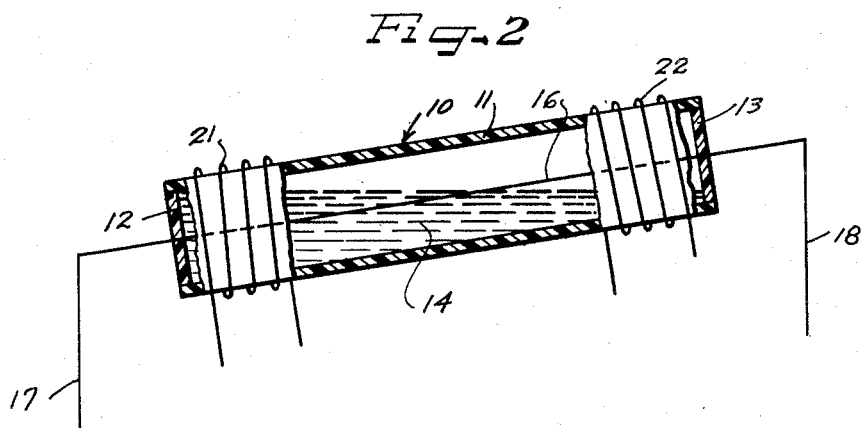
INVENTOR.
Theodore T. Conrad
BY
ATTORNEYS 3,184,861
POSITION DEVIATION SENSING DEVICE
UTILIZING SKIN EFFECT
Theodore T. Conrad, Mayfield Heights, Ohio, assignor to Thompson Ramo Wooldridge Inc., Cleveland, Ohio, a corporation of Ohio
Filed Apr. 2, 1962, Ser. No. 184,233
5 Claims. (Cl. 33—206)

The present invention relates to an improved position sensing device for detecting deviation from a predetermined orientation. The device of the present invention is useful in a wide variety of fields wherever the maintenance of a particular angle or level is required as in flight mechanisms, scales, gauges, balancing equipment, seismographs, and gyroscopic correcting mechanisms.

One of the objects of the present invention is to provide an improved, but relatively simple position sensing device for detecting deviations from a predetermined orientation.

Another object of the present invention is to provide a position sensing device which produces an immediate error signal which can be employed in servo mechanisms and the like.

Still another object of the invention is to provide an improved position sensing device which is simple in construction and economical to manufacture.

The device of the present invention employs a liquid tight casing which is partly filled with a liquid electrolyte. A conductor extends through the casing in contact with the electrolyte. A pair of coils is provided in spaced relation along the casing, the coils being wound to provide equal and opposite induced voltages in the position of the casing in which it is at its desired orientation. The conductor is connected to a source of high frequency voltage, the frequency being sufficiently high to produce an appreciable "skin effect" in the passage of the high frequency current through the conductor. When the casing is oriented in proper alignment, the voltages induced by the skin effect of the current flow are equal and opposite, so substantially no voltage is detected at the sensing device which is employed with the coils. When, however, a condition of unbalance exists, as when the casing is tilted, an electrical unbalance then occurs between the voltages induced in the two coils, and this error voltage can be amplified and utilized as a feedback or error voltage in a servo system arranged to correct the deviation.

It is well known that at high frequencies, the current carried by a conductor is not uniformly distributed over the conductor cross section, as in the case with direct current, but rather tends to be concentrated nearer the surface. This action, called the skin effect, is the result of magnetic flux lines that circle parts but not all of the conductor. Those parts of the cross section which are circled by the largest number of flux lines have higher inductance than other parts of the conductor, and hence a greater reactance. The result is a redistribution of current over the cross section in such a way as to cause those parts of the conductor having the highest reactance, that is, those parts nearer the center, to carry the least current. With a round wire, this causes the current densities to become maximum at the surface and least at the center. With a square box the greatest concentration of current is at the corners, with the flat sides coming next and the center carrying the least current. With a flat strip the current density is greatest at the edges, considerable at the flat surfaces, and again least in the center. In every case, the current is so distributed as to cause those parts of the cross section that are enclosed by the greatest number of flux lines to carry the last current.

The redistribution of current over a conductor cross section that is associated with skin effect causes the ratio of effective alternating current resistance to direct current resistance to be greater than unity, because in the presence of skin effect, portions of the conductor are not fully effective in carrying current. Along with this increase in resistance, there is also a decrease in the inductance of the conductor because of the fact that the redistribution of current is always of such a character as to make the flux linkages, and hence the inductance, less than with a uniform current distribution. The magnitude of these effects on inductance and A.C. resistance increases with frequency, conductivity, magnetic permeability, and size of the conductor. This is because a high frequency increases the difference in reactance resulting from the different inductance of various current paths, whether greater conductivity makes the same difference in reactance more effective in modifying current distribution, and a greater magnetic permeability increases the flux.

In accordance with the present invention, this skin effect is utilized to create a difference in induced voltage in the two coils by physical movement of the electrolyte which results from the unbalance of the device from its predetermined orientation.

A further description of the present invention will remain in conjunction with the attached sheet of drawings which illustrates a preferred embodiment thereof.

In the drawings:

FIGURE 1 is a somewhat schematic view, partly in cross section, illustrating the sensing device of the present invention in its "balanced" condition; and FIGURE 2 is a fragmentary view, partly in cross section, illustrating the sensing device upon deviation from its original horizontal alignment.

As shown on the drawings:

In FIGURE 1, reference numeral 10 indicates generally a liquid-tight casing composed of a non-magnetic material such as a synthetic resin. The casing 10 is in the form of a tube 11 having both its ends sealed by means of a pair of opposed end caps 12 and 13. A liquid electrolyte 14 partially fills the interior of the casing 10. The electrolyte 14 may be a material such as mercury, a fused salt, an alkali solution, or similar electrolyte. A conductor 16 extends through the casing 10 and through the end caps 12 and 13. The conductor 16 is composed of a material which is resistant to attack by the electrolyte 14, and may consist, for example, of a platinum wire. It should be noted that there is sufficient electrolyte 14 to wholly immerse the conductor 16 when the casing 10 is horizontal.

The ends of the conductor 16 extend beyond the confines of the tube 11 and are connected by means of conductors 17 and 18 to a high frequency source generally illustrated at numeral 19 in the drawings. As mentioned in the foregoing discussion, the skin effect is most pronounced at higher frequencies, and the sensitivity of the device increases with an increase in frequency. For most uses, frequencies on the order of a few hundred cycles (200 or so) to frequencies in the megacycle ranges will be suitable for use in conjunction with the sensing device of the present invention.

The sensing device also includes a coil 21 located near one end portion of the tube 11, and a second coil 22 located near the opposite end. The coils 21 and 22 are wound such that they would, upon identical excitation, produce equal and opposite induced voltages. The ends of the coils 21 and 22 are connected to a sensor mechanism generally indicated at numeral 23 in the drawings. This sensor mechanism 23 may include, for example, an amplifier and other means for feeding the error signal produced upon an unbalance in the system to a suitable servo system or the like which is arranged to correct the unbalance by reestablishing the original orientation.

In the system shown in the drawings, the device is used to detect deviations from the horizontal. When the casing 10 is horizontal, and the conductor 16 is energized with the high frequency current from the source 19, equal and opposite voltages will be induced in the coils 21 and 22, so that the error signal in the sensor 23 is zero. When, however, a condition of unbalance occurs as illustrated in FIGURE 2, when the axis of the casing 10 deviates from the desired horizontal alignment, the electrolyte 14 shifts in response to this deviation. Hence, a larger cross section of electrically conductive core is then provided for the coil 21 as compared to the core of the coil 22. In this condition, the voltages induced in the coils 21 and 22 become unbalanced and this unbalance is amplified in the sensor system 23 in the manner of any error signal to either give an indication that the deviation exists, or to actually correct the deviation by means of a servo mechanism.

While the device shown in FIGURES 1 and 2 is intended to detect deviations from a horizontal position it should be evident that the device can be balanced at any suitable angle so that deviation from this angle induces a similar error signal. It should also be evident that various modifications can be made to the described embodiments without departing from the scope of the present invention.

I claim as my invention:

1. A device for detecting deviation from a predetermined orientation comprising
   a non-magnetic liquid-tight casing,
   an electrolyte partially filling said casing,
   a conductor extending through said casing in contact with said electrolyte, and
   a pair of coils in spaced relation along said casing,
   said coils being wound such that they have induced in them equal and opposite voltages when said coils are energized by a high frequency source and when said device has said predetermined orientation.

2. A device for detecting deviation from a predetermined orientation which comprises
   a non-magnetic liquid-tight casing,
   a mercury electrolyte partially filling said casing,
   a conductor extending through said casing in contact with said electrolyte, and
   a pair of coils in spaced relation along said casing,
   said coils being wound such that they have induced in them equal and opposite voltages when said coils are energized by a high frequency source and when said device has said predetermined orientation.

3. A position sensing device comprising
   a non-magnetic liquid-tight casing,
   a liquid electrolyte partially filling said casing,
   a conductor extending through said casing in contact with said electrolyte,
   a pair of coils in spaced relation along said casing,
   said coils being wound to produce equal and opposite induced voltages upon equal energizations,
   a high frequency electromagnetic energy source connected to said conductor,
   and a sensing means connected to said coils and arranged to detect an unbalance in the induced voltages in said coils upon deviation of said casing from a predetermined position.

4. A position sensing device comprising
   a non-magnetic liquid-tight casing,
   a mercury electrolyte partially filling said casing,
   a conductor extending through said casing in contact with said electrolyte,
   a pair of coils in spaced relation along said casing,
   said coils being wound to provide equal and opposite induced voltages upon equal energization,
   a high frequency electromagnetic energy source connected to said conductor,
   and a sensing means connected to said coils and arranged to detect an unbalance in the induced voltages in said coils upon deviation of said casing from a predetermined position.

5. A position sensing device comprising
   a non-magnetic liquid-tight casing,
   a liquid electrolyte partially filling said casing,
   a conductor extending through said casing in contact with said electrolyte,
   a high frequency electromagnetic energy source connected to said conductor,
   a pair of coils disposed at opposite ends of said casing and wound to produce equal and opposite induced voltages when said casing is in a predetermined orientation, and an error sensing means connected to said pair of coils to detect an unbalance in said induced voltages when said casing deviates from said predetermined orientation.

References Cited by the Examiner
UNITED STATES PATENTS

| | | | |
|---|---|---|---|
| 2,414,449 | 1/47 | Chapin | 33—206.5 |
| 2,543,843 | 3/51 | Frosch | 336—174 X |
| 2,825,978 | 3/58 | Davis | 324—61 X |
| 3,083,469 | 4/63 | Herbst | 33—206.5 |

ISAAC LISANN, *Primary Examiner.*

W. L. CARLSON, *Examiner.*